Dec. 13, 1938.   D. E. MORPHEW   2,140,431
SPRING WHEEL
Filed Sept. 7, 1937
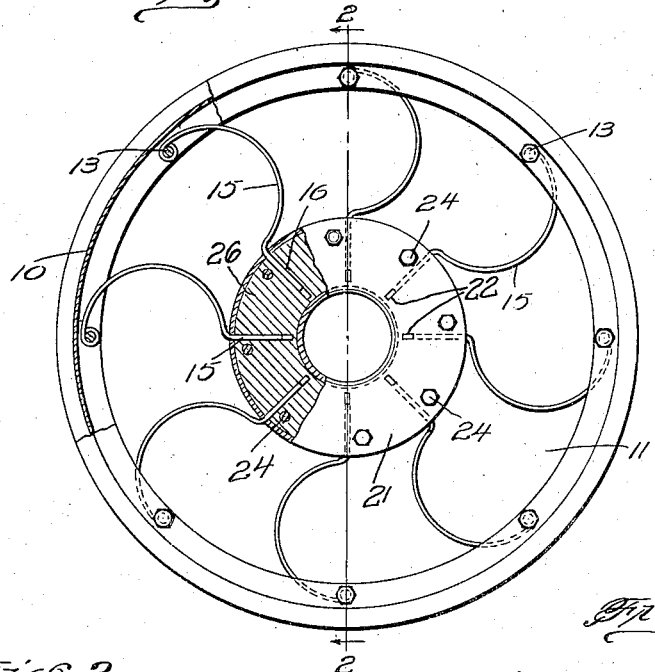
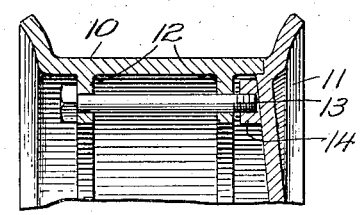
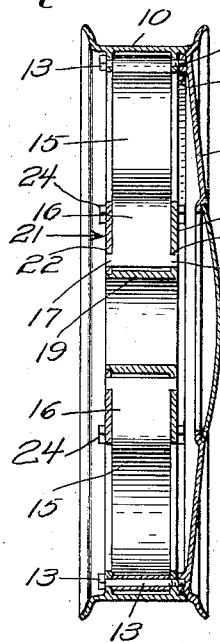
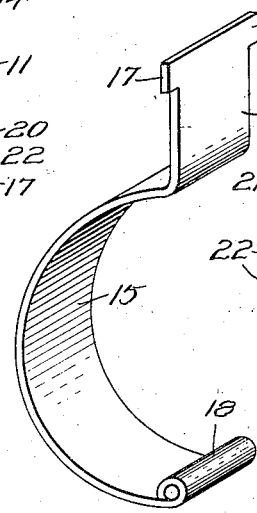
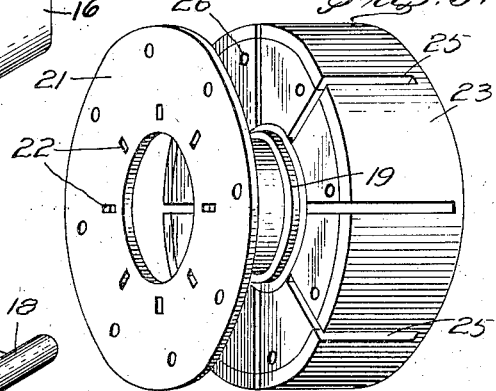
David E. Morphew
INVENTOR
BY Victor J. Evans & Co.
ATTORNEYS Patented Dec. 13, 1938

2,140,431

UNITED STATES PATENT OFFICE 2,140,431

SPRING WHEEL

David E. Morphew, Roann, Ind.

Application September 7, 1937, Serial No. 162,732

1 Claim. (Cl. 152—50)

This invention relates to spring wheels and has for an object to provide a novel hub and felly yieldably connected by arcuate springs so that shocks and jars will be absorbed by yielding of the springs to permit relative movement of the felly and hub.

A further object is to provide a spring wheel of this type which will be practically noiseless in operation, this end being attained by the provision of a rubber filler in the hub forming a noise absorbing medium.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a side elevation of a spring wheel constructed in accordance with the invention with portions broken away.

Figure 2 is a cross sectional view of the spring wheel taken on the line 2—2 of Figure 1.

Figure 3 is a fragmentary cross sectional view showing the flanged rim and facing disc of the felly.

Figure 4 is a detail perspective view of one of the springs.

Figure 5 is an exploded perspective view of the hub.

Referring now to the drawing in which like characters of reference designate similar parts in the various views, 10 designates a flanged rim and 11 a flanged facing disc, the rim having perforated lugs 12 at intervals, as best shown in Figures 1 and 3, through which bolts 13 are passed, these bolts being threaded into integral nuts 15 on the facing disc to secure the disc to the flanged rim. By simply unscrewing the bolts 13 the disc 14 may be removed to permit lateral removal and replacement of a tire of any preferred type.

The bolts 13 form means for securing the outer ends of arcuate springs 15 to the felly. One of the springs is shown in Figure 4 to comprise a straight shank 16 having laterally disposed stop lugs 17 at the free ends. The spring 15 is arcuate and at a point diametrically opposite the shank is provided with a rolled sleeve 18 adapted to be engaged on a respective one of the bolts 13 to secure the spring to the felly. The shank of the spring is secured to a hub best shown in Figures 1 and 5, and which will now be described.

A cylindrical hub 19 is provided with an annular removable side wall 20. Opposite the side wall 20 is the side wall 21 of a transversely slotted drum 23 which is disposed concentric with the hub. Both side walls are provided with aligned openings 22 to receive the stop lugs 17 of the springs 15. The side wall 20 is removably secured in place by bolts 24 passed through both the walls 20 and 21 and removably secures the inner ends of the springs to the hub. The transverse slots 25 of the drum receive the straight shanks 16 of the springs 15. A rubber filler 26 is disposed in the space between the drum 23 and the hub 19 and provides a yielding medium which envelopes the shanks of the springs and prevents noise of any kind during use of the wheel.

In operation when the tire or felly strikes an obstruction the springs will all yield simultaneously and permit the hub to move in the direction of the obstruction thereby placing the springs under tension to resist the shock and at the same time return the hub to normal position after the moment of impact.

From the above description it is thought that the construction and operation of the invention will be fully understood without further explanation.

What is claimed is:

A spring wheel including a flanged rim, a disc, an annular series of bolts connecting the disc to the rim, a cylindrical hub, a drum concentric with the hub and having a side wall integral with one end of the hub, an annular side wall on the hub opposite the drum side wall, springs pivotally connected at their outer ends to said bolts, said springs being arcuate in contour, said drum being provided with transverse slots, the inner ends of said springs being straight and projecting into the drum through said slots, stop lugs projecting laterally of said straight inner ends of said springs, there being aligned oppositely disposed annular series of openings in said arcuate side wall of the hub and said side wall of the drum receiving said lugs, bolts engaged through said arcuate side wall and said side wall of the drum to removably secure the arcuate side wall to the hub, removal of said arcuate side wall permitting removal of the inner ends of the springs from the drum, and a rubber filler between the hub and the cylindrical wall of the drum enveloping the inner ends of the springs.

DAVID E. MORPHEW.